United States Patent
Shigeeda (10) Patent No.: US 9,571,298 B2
(45) Date of Patent: Feb. 14, 2017

(54) NETWORK SYSTEM

(71) Applicant: Tetsuya Shigeeda, Tokyo (JP)

(72) Inventor: Tetsuya Shigeeda, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 18 days.

(21) Appl. No.: 14/761,916

(22) PCT Filed: Feb. 19, 2013

(86) PCT No.: PCT/JP2013/054041
§ 371 (c)(1),
(2) Date: Jul. 17, 2015

(87) PCT Pub. No.: WO2014/128837
PCT Pub. Date: Aug. 28, 2014

(65) Prior Publication Data
US 2015/0365253 A1    Dec. 17, 2015

(51) Int. Cl.
*H04L 12/437* (2006.01)
*H04L 12/40* (2006.01)

(52) U.S. Cl.
CPC ....... *H04L 12/40176* (2013.01); *H04L 12/437* (2013.01)

(58) Field of Classification Search
None
See application file for complete search history.

(56) References Cited

U.S. PATENT DOCUMENTS

| 7,826,743 B2 | 11/2010 | Tian et al. |
| 8,755,307 B2 | 6/2014 | Shigeeda et al. |
| 2007/0165658 A1 | 7/2007 | Mutoh |

(Continued)

FOREIGN PATENT DOCUMENTS

| JP | 08-265319 A | 10/1996 |
| JP | 2002-190808 A | 7/2002 |

(Continued)

OTHER PUBLICATIONS

Extended European Search Report dated Mar. 23, 2016, issued by the European Patent Office in the corresponding European Application No. 13875516.0. (9 pages).

(Continued)

*Primary Examiner* — Jung-Jen Liu
(74) *Attorney, Agent, or Firm* — Buchanan Ingersoll & Rooney PC (57) ABSTRACT

In a configuration where an apparatus network is connected to a backbone network at two points, a first apparatus and a first switch device are normally communicatively connected to each other and also communication between a second apparatus and a second switch device is normally disconnected. The first apparatus monitors the link state with the first switch device. The second apparatus queries the first apparatus about the link state. When the first apparatus and the first switch device are not communicatively connected to each other or when the second apparatus cannot communicate with the first apparatus via the apparatus network, the second apparatus cancels the disconnected state with the second switch device.

5 Claims, 4 Drawing Sheets

(56) References Cited

U.S. PATENT DOCUMENTS

| | | | |
|---|---|---|---|
| 2010/0061229 A1* | 3/2010 | Maisch | H04L 12/40176 370/222 |
| 2011/0205886 A1* | 8/2011 | Maruyama | H04L 12/40176 370/225 |
| 2011/0317555 A1* | 12/2011 | Kleineberg | H04L 12/40176 370/230 |
| 2012/0236710 A1 | 9/2012 | Tochio | |
| 2013/0094352 A1* | 4/2013 | Bouhal | H04L 12/40176 370/225 |
| 2013/0177021 A1 | 7/2013 | Kitayama et al. | |
| 2014/0347977 A1 | 11/2014 | Shigeeda | |

FOREIGN PATENT DOCUMENTS

| | | |
|---|---|---|
| JP | 2003-037636 A | 2/2003 |
| JP | 2006-148922 | 6/2006 |
| JP | 4790088 B | 10/2011 |
| JP | 5106706 B1 | 12/2012 |
| WO | WO 2010/087259 A1 | 8/2010 |
| WO | 2012/086019 A1 | 6/2012 |

OTHER PUBLICATIONS

International Search Report (PCT/ISA/210) mailed on Mar. 19, 2013, by the Japanese Patent Office as the International Searching Authority for International Application No. PCT/JP2013/054041.
Written Opinion (PCT/ISA/237) mailed on Mar. 19, 2013, by the Japanese Patent Office as the International Searching Authority for International Application No. PCT/JP2013/054041.
Notice of Rejection issued in the corresponding Japenese Application No. 2015-501116 dated Mar. 18, 2015.
"Routing and Switching Handbook" written by Gene, published by Shuwa System Co., Ltd., Mar. 13, 2008, pp. 115-144.
Office Action issued on Jul. 28, 2015, by the Japanese Patent Office in corresponding Japanese Patent Application No. 2015-501116 and an English Translation of the Office Action (4 pages).
European Office Action dated Nov. 14, 2016 issued in corresponding European Patent Appln. No. 13875516.0 (4 pages).

* cited by examiner

NETWORK SYSTEM

FIELD

The present invention relates to a network system having a redundant configuration.

BACKGROUND

In order to increase the availability of a network, network redundancy is implemented as a general procedure. Network redundancy refers to securing an additional network apparatus and an additional network line and setting them in standby mode as a backup system. In a case where a network apparatus or a network line in operation is down, it is switched to the standby backup system, and therefore the network can continue to operate without being down. A redundant network system has been widely used.

When network redundancy is implemented as described above, the availability of the network can be increased. However, network redundancy needs to be appropriately implemented. For example, when a loop is formed in the network due to the redundancy and a broadcast frame is transmitted to this network, the broadcast frame continuously circulates around this loop, thereby eventually using up the communication band and bringing the network system down. The phenomenon as described above is referred to as "broadcast storm". In order to prevent this phenomenon and properly operate the redundant network, a spanning tree protocol has been conventionally used, for example (see, for example, Non Patent Literature 1).

A spanning tree is a function provided to switches that constitute the network in order to prevent the broadcast frame from continuously circulating around the loop. This function is realized by a spanning tree protocol. Even though there is a loop in the network configured from the switches, when the spanning tree is enabled, a port (a blocking port) that does not receive communication in practice is automatically set, and eventually a tree structure is formed with one of the switches at the top.

CITATION LIST

Non Patent Literature

Non Patent Literature 1: "Routing and Switching Handbook" written by Gene, published by SHUWA SYSTEM CO., LTD., (Chapter 4 "Spanning Tree Protocol")

SUMMARY

Technical Problem

A sub-network connected to a backbone network is considered. In a case where the connection of the sub-network to the backbone network is especially important, the sub-network can have a redundant configuration by being connected to the backbone network at two points.

However, as a result of this connection, a loop is formed by the backbone network and the sub-network. Therefore, in order to prevent the occurrence of a broadcast storm, it is necessary to perform a procedure not to form a loop communication path.

As described above, the spanning tree protocol can be applied, for example, to solve this loop-structure problem. In this case, both the backbone network and the sub-network are required to comply with the spanning tree protocol. Therefore, in the case where a constructed backbone network does not comply with the spanning tree protocol, when a sub-network is connected to the backbone network, it is necessary to reconstruct a system such that not only the sub-network, but also the backbone network, comply with the spanning tree protocol.

Further, even in a case where the backbone network complies with the spanning tree protocol, when a sub-network is connected to the backbone network, it is necessary to apply the spanning tree protocol to the entire network after the sub-network is connected, in order to reconstruct a communication path in the entire network.

Furthermore, when the spanning tree protocol is applied, time is required for convergence of the spanning tree because of processes such as analyzing the connecting structure of the network.

The present invention has been achieved in view of the above, and an object of the present invention is to provide a network system that is capable of preventing formation of a loop communication path and securing the redundancy of a network by means of a simple control process without applying a spanning tree protocol, in a case where the network is constituted by connecting an apparatus network that is a sub-network to a backbone network at two points.

Solution to Problem

In order to solve the above problems and achieve the object, an aspect of the present invention is a network system including: a backbone network that is constituted by combining a plurality of switch devices; and an apparatus network that is constituted by combining a plurality of apparatuses, each of which includes therein a switch unit and a connection control unit that is capable of controlling a connection of the switch unit to perform communication, where the apparatus network is connected to the backbone network at only two points by connecting a switch unit of a first apparatus that is one of the apparatuses to the backbone network and by connecting a switch unit of a second apparatus that is another one of the apparatuses to the backbone network, wherein a connection control unit of the first apparatus includes a determination unit that determines whether the switch unit of the first apparatus is communicatively connected to the backbone network, a connection control unit of the second apparatus includes an initial setting unit that initializes a setting of direct communication with the backbone network to a state where the switch unit of the second apparatus is disconnected from the backbone network at startup, and a determination-information obtaining unit that obtains determination information regarding whether the switch unit of the first apparatus is communicatively connected to the backbone network by querying the determination unit via the apparatus network, and based on the determination information obtained from the determination unit by the determination-information obtaining unit, when the switch unit of the first apparatus is communicatively connected to the backbone network, the connection control unit of the second apparatus maintains a state where the switch unit of the second apparatus is disconnected from the backbone network as for direct communication with the backbone network, and when the switch unit of the first apparatus is not communicatively connected to the backbone network or when the second apparatus is not capable of communicating with the first apparatus, the connection control unit of the second apparatus connects the switch unit of the second apparatus to the backbone network such that the switch unit of the second apparatus is capable of directly communicating with the backbone network.

Advantageous Effects of Invention

According to the present invention, an effect is obtained where it is possible to provide a network system that is capable of preventing formation of a loop communication path and securing the redundancy of a network by means of a simple control process without applying a spanning tree protocol, in a case where the network is constituted by connecting an apparatus network to a backbone network at two points.

DESCRIPTION OF EMBODIMENTS

Exemplary embodiments of a network system according to the present invention will be explained below in detail with reference to the accompanying drawings. The present invention is not limited to the embodiments.

First Embodiment

Figure 1:
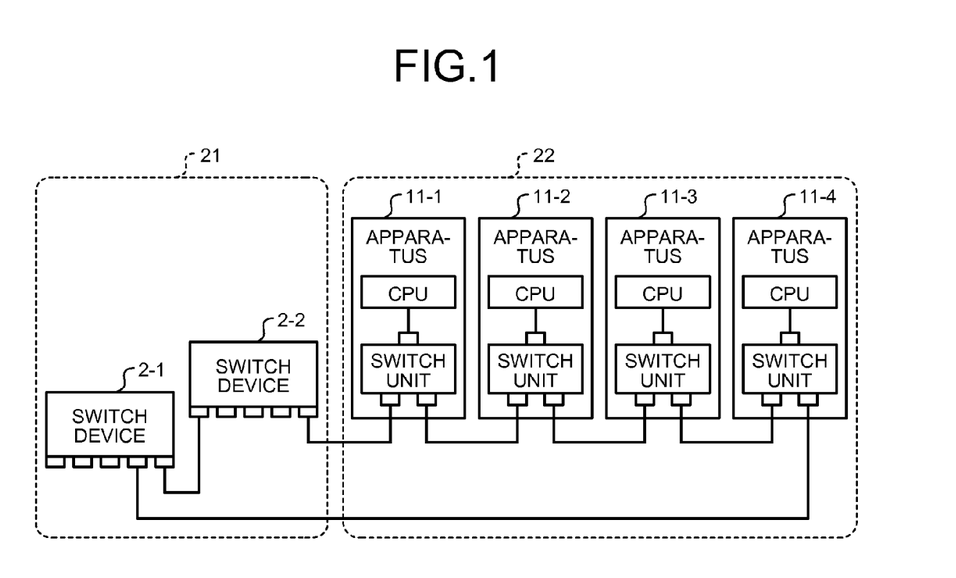
FIG. 1 is a diagram illustrating an example of the configuration of a network system according to a first embodiment.

FIG. 1 is a diagram illustrating an example of the configuration of a network system according to the present embodiment. As illustrated in FIG. 1, the network system according to the present embodiment is configured from a backbone network 21 and an apparatus network 22 that is a sub-network connected to the backbone network 21 at two points. The backbone network 21 is constituted by combining switch devices 2-1 and 2-2, for example. The apparatus network 22 is configured to include apparatuses 11-1 to 11-4, for example.

Each of the switch devices 2-1 and 2-2 is the Ethernet® switch, for example. Each of the switch devices 2-1 and 2-2 includes five ports for network connections, for example. The switch devices 2-1 and 2-2 are connected to each other. While in the example illustrated in FIG. 1, the number of switch devices that constitute the backbone network 21 is two, it is general that a plurality of switch devices can constitute the backbone network 21.

The apparatuses 11-1 to 11-4 are connected in a daisy chain, for example. Specifically, the apparatus 11-1 is connected to the apparatus 11-2, the apparatus 11-2 is connected to the apparatus 11-3, and the apparatus 11-3 is connected to the apparatus 11-4. The apparatus 11-1 (first apparatus), located at one end of the daisy-chain connection in the apparatus network 22, is connected to the switch device 2-2 (first switch device). The apparatus 11-4 (second apparatus), located at the other end of the daisy-chain connection in the apparatus network 22, is connected to the switch device 2-1 (second switch device).

As described above, in the network system according to the present embodiment, the apparatus network 22 is connected to the backbone network 21 at only two connection points that are the connection point between the switch device 2-2 and the apparatus 11-1 and the connection point between the switch device 2-1 and the apparatus 11-4. Therefore, in this network system, a physical loop (ring) is formed by the switch devices 2-1 and 2-2 and the apparatuses 11-1 to 11-4.

Figure 2:
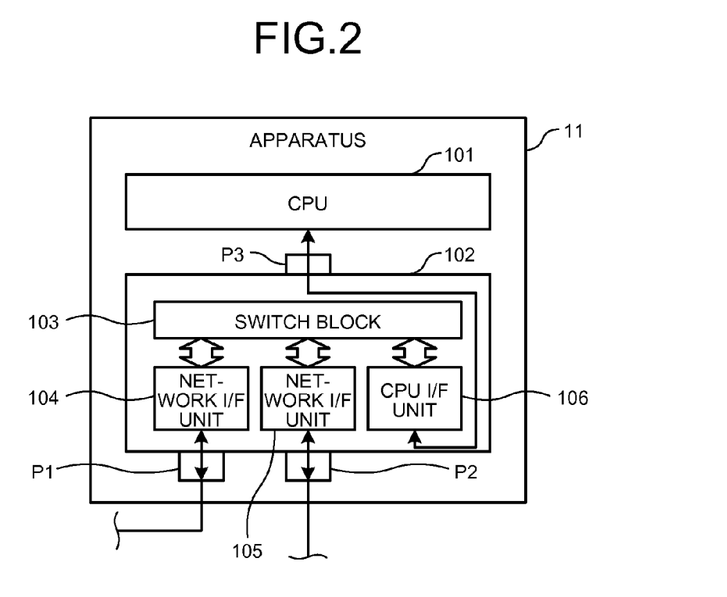
FIG. 2 is a diagram illustrating an example of the internal configuration of an apparatus according to the first embodiment.

FIG. 2 is a diagram illustrating an example of the internal configuration of the apparatus according to the present embodiment. In FIG. 2, an apparatus 11 represents any of the apparatuses 11-1 to 11-4 in FIG. 1, a common configuration to these apparatuses is illustrated. The apparatus 11 is configured to include a CPU 101 (connection control unit) and a switch unit 102 connected to this CPU 101.

For example, the switch unit 102 includes a switch block 103 that has a function as the Ethernet® switch body, network interface (I/F) units 104 and 105, each of which is connected to the switch block 103 to serve as an interface with an external network cable, and a CPU interface (I/F) unit 106 that is connected to the switch block 103 to serve as an interface with the CPU 101.

The switch unit 102 includes ports P1 to P3, for example. The port P1 is connected to the switch block 103 through the network I/F unit 104 and is also connected to the external network cable. The port P2 is connected to the switch block 103 through the network I/F unit 105 and is also connected to the external network cable. The port P3 is connected to the switch block 103 through the CPU I/F unit 106 and is also connected to the CPU 101.

The switch block 103 operates as a switch between the network I/F units 104 and 105 and the CPU I/F unit 106. The switch block 103 is constituted by an IC package, for example. The network I/F units 104 and 105 convert a cable signal to an electrical signal, and vice versa. The network I/F units 104 and 105 are physical layer interfaces. The CPU 101 is connected to the switch block 103 through the CPU I/F unit 106. By controlling this switch block 103, the CPU 101 controls the connection of the switch unit 102 and can communicate externally. FIG. 2 only illustrates a part of the internal configuration of the apparatus 11, which is used for communication. Therefore, illustrations of the configuration specific to the apparatus, aside from the communication function, are omitted. For example, in a case where the apparatus 11 is a display device, it is apparent that there are a display unit and the like in the apparatus 11.

As described above, the apparatus 11-1 is connected to the switch device 2-2 in the backbone network 21 through the port P1 by a network cable. Also, the apparatus 11-4 is connected to the switch device 2-1 in the backbone network 21 through the port P2 by a network cable. Therefore, a physical loop (ring) is formed by the apparatus network 22, the backbone network 21, and the network cables connecting them. Accordingly, in order to prevent the occurrence of a broadcast storm, it is necessary to configure an actual communication path not to have a loop.

Figure 3:
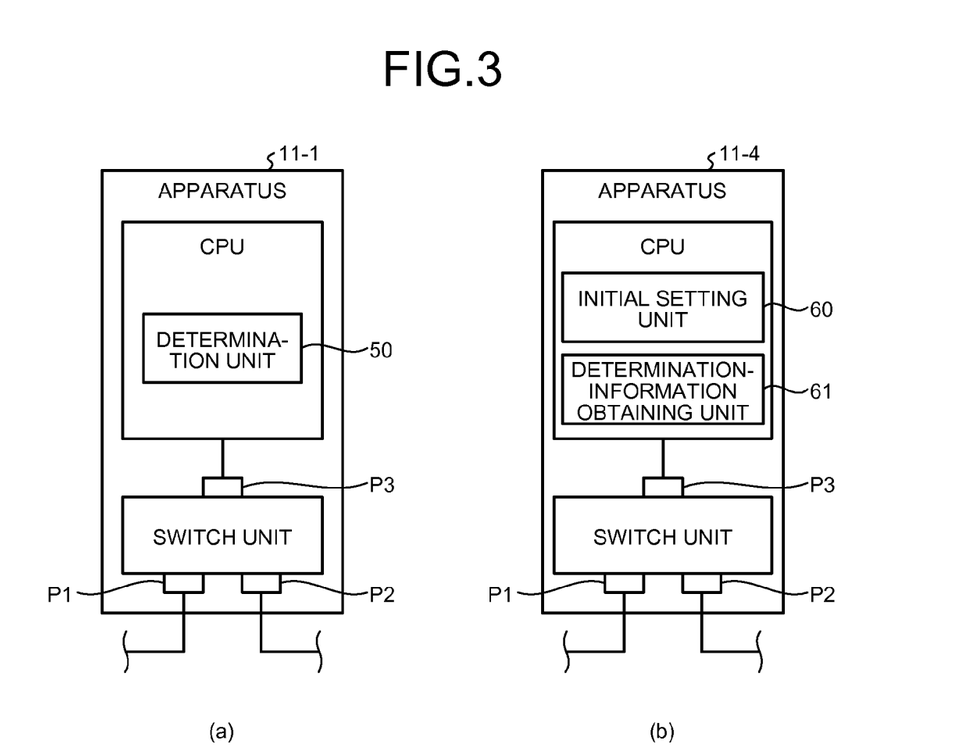
FIG. 3 is a diagram illustrating a part of the functional configuration of a CPU (connection control unit) in apparatuses 11-1 and 11-4.

Consequently, in the present embodiment, the apparatuses 11-1 and 11-4 are provided with functions as described below. FIG. 3 is a diagram illustrating a part of the functional configuration of the CPU (connection control unit) in the apparatuses 11-1 and 11-4.

The apparatus 11-1 is communicatively connected to the switch device 2-2 in the backbone network 21 through the port P1 by a network cable. That is, upon startup (power on), the switch unit of the apparatus 11-1 is communicatively connected to the switch device 2-2 unless a communication failure occurs in the network cable or the like.

The CPU (connection control unit) of the apparatus 11-1 includes a determination unit 50 (FIG. 3(a)) that determines whether the switch unit of the apparatus 11-1 is communicatively connected to the switch device 2-2. The determination unit 50 monitors the link state between the switch device 2-2 and the switch unit of the apparatus 11-1. When the determination unit 50 detects disconnection of the link between the switch device 2-2 and the switch unit of the apparatus 11-1, the determination unit 50 determines that the switch unit of the apparatus 11-1 is not communicatively connected to the switch device 2-2. The determination unit 50 performs this determination process at a given interval, for example.

Next, functions of the apparatus 11-4 are described. First, the apparatus 11-4 initializes the settings in order to disconnect direct communication with the backbone network 21 through the port P2 at startup (power on). That is, the CPU (connection control unit) of the apparatus 11-4 includes an initial setting unit 60 (FIG. 3(b)) that initializes the settings of direct communication with the switch device 2-1 to a state where the switch unit of the apparatus 11-4 is disconnected from the switch device 2-1 at startup (power on).

Upon startup (power on), the apparatus 11-4 obtains determination information regarding whether the switch unit of the apparatus 11-1 is communicatively connected to the backbone network 21 from the apparatus 11-1 (the determination unit 50) via the apparatus network 22. That is, the CPU (connection control unit) of the apparatus 11-4 includes a determination-information obtaining unit 61 that obtains determination information regarding whether the switch unit of the apparatus 11-1 is communicatively connected to the switch device 2-2 from the determination unit 50 using the apparatus network 22. For example, the determination-information obtaining unit 61 queries the determination unit 50 about the determination information and therefore can obtain the determination information as a response from the determination unit 50. For example, the determination-information obtaining unit 61 queries the determination unit 50 at a given interval and can obtain determination information sent back from the determination unit 50 at the given interval. The determination-information obtaining unit 61 can obtain determination information from the determination unit 50 by this method or any other method. For example, the apparatus 11-1 does not depend on a query from the determination-information obtaining unit 61, but can regularly transmit determination information to the apparatus 11-4 using the apparatus network 22, such that the determination-information obtaining unit 61 obtains this determination information.

Further, the CPU (connection control unit) of the apparatus 11-4 refers to the determination information obtained from the determination unit 50 by the determination-information obtaining unit 61. When the switch unit of the apparatus 11-1 is communicatively connected to the switch device 2-2, the CPU (connection control unit) of the apparatus 11-4 maintains the state where the switch unit of the apparatus 11-4 is disconnected from the backbone network 21 as for direct communication with the switch device 2-1. When the switch unit of the apparatus 11-1 is not communicatively connected to the switch device 2-2 or when the apparatus 11-4 cannot communicate with the apparatus 11-1, the CPU (connection control unit) of the apparatus 11-4 sets the switch unit of the apparatus 11-4 to be connected to the switch device 2-1 so as to be capable of directly communicating with the switch device 2-1. That is, the apparatus 11-4 normally disconnects communication with the backbone network 21 through the port P2 to prevent formation of a loop communication path. On the other hand, in a case where a communication failure has occurred between the apparatus 11-1 and the switch device 2-2 or where a communication failure has occurred in the apparatus network 22 connecting the apparatus 11-1 and the apparatus 11-4, the apparatus 11-4 starts communicating with the backbone network 21 through the port P2, which has been disconnected, in order to secure the redundancy of network communication.

Disconnection and cancellation of communication through the port P2 in the apparatus 11-4 can be easily achieved by using a port VLAN (virtual LAN), for example. Specifically, the same VLAN number is set for the ports P1 and P3, and the VLAN number that is different from that for the ports P1 and P3 is set for the port P2. In this manner, the ports P1 and P3 are set to a different group from the port P2.

The ports P1 and P3 are set to belong to the same group, and the port P2 is set to belong to a different group from the ports P1 and P3. Therefore, a communication path is established between the network I/F unit 104 connected to the port P1 and the CPU I/F unit 106 connected to the port P3. However, a communication path is not established for an independently-grouped single port P2. Accordingly, communication between the network I/F unit 104 and the network I/F unit 105, i.e., communication between the ports P1 and P2, is disconnected.

Figure 4:
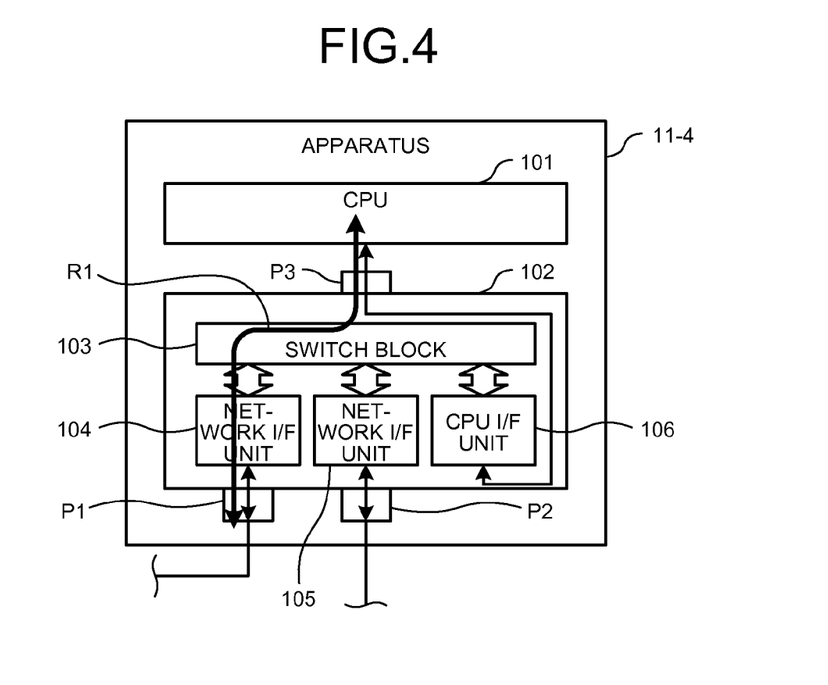
FIG. 4 is an explanatory diagram of a disconnecting function of a port P2 in the apparatus 1-4.

FIG. 4 schematically illustrates, by an arrow R1, that as a result of setting the port VLAN as described above, the CPU 101 can communicate with the backbone network 21 via the port P1; however, the CPU 101 cannot communicate with the backbone network 21 via the port P2.

As described above, because, in the apparatus 11-4, the port VLAN is set in the switch block 103, communication between the network I/F unit 104 and the network I/F unit 105 in the apparatus 11-4 is normally disconnected, and communication through the port P2 in the apparatus 11-4 is normally disconnected. Therefore, although the backbone network 21 and the apparatus network 22 are connected at two points, a loop communication path is not formed in the network. That is, although a physical loop is formed by connecting the backbone network 21 and the apparatus network 22, a communication path between the backbone network 21 and the apparatus network 22 passes through the network cable connecting the switch device 2-2 and the apparatus 11-1, and accordingly the backbone network 21 and the apparatus network 22 are substantially in a state of being connected at this one point.

Meanwhile, when the switch unit of the apparatus 11-1 is not communicatively connected to the switch device 2-2 or when the apparatus 11-4 cannot communicate with the apparatus 11-1, the apparatus 11-4 determines that a fault has occurred in the connection between the apparatus 11-1 and the switch device 2-2 or in the apparatus network 22, and then cancels the port VLAN setting. As a result of this, in the apparatus 11-4, it is possible to communicate between the network I/F unit 104, the network I/F unit 105, and the CPU I/F unit 106. That is, the apparatus 11-4 can perform communication through two ports P1 and P2 in a similar manner to the other apparatuses 11-1 to 11-3.

Next, operations of the network system in the present embodiment are described with reference to FIGS. 1 to 4. First, in a state where the apparatus network 22 is connected to the backbone network 21 as illustrated in FIG. 1, the power is turned on to start up the network system.

At startup, the apparatus 11-1 is communicatively connected to the switch device 2-2 through the port P1. Upon startup, the determination unit 50 in the apparatus 11-1 monitors the link state with the switch device 2-2 at, for example, a given interval, determines whether the switch unit of the apparatus 11-1 is communicatively connected to the switch device 2-2, and stores the determination result as determination information.

Meanwhile, at startup, the apparatus 11-4 is set to a state of disconnecting communication with the switch device 2-1 through the port P2. This is performed by the initial setting unit 60 by setting the port VLAN in the switch block 103, for example. Therefore, a loop is not formed in a network communication path. The apparatuses 11-1 to 11-4 are all connected to the backbone network 21 via the switch device 2-2.

Upon startup, the apparatus 11-4 obtains determination information regarding the link state with the switch device 2-2 from the apparatus 11-1 at a given interval, for example. This is performed, for example, by the determination-information obtaining unit 61 by querying the determination unit 50 at a given interval and by the determination unit 50 by sending the latest determination information back to the determination-information obtaining unit 61 as a response to the query.

Next, based on the latest determination information, when the switch unit of the apparatus 11-1 is communicatively connected to the switch device 2-2, the CPU (connection control unit) of the apparatus 11-4 maintains the state of disconnecting communication with the switch device 2-1 through the port P2. That is, as for direct communication with the switch device 2-1, the switch unit of the apparatus 11-4 remains in the disconnected state from the switch device 2-1. In contrast to this, based on the latest determination information, when the switch unit of the apparatus 11-1 is not communicatively connected to the switch device 2-2 or when the apparatus 11-4 cannot communicate with the apparatus 11-1 via the apparatus network 22, the CPU (connection control unit) of the apparatus 11-4 determines that a communication failure has occurred between the apparatus 11-1 and the switch device 2-2 or a communication failure has occurred in the apparatus network 22, and communicatively connects the switch unit of the apparatus 11-4 to the switch device 2-1 through the port P2. For example, the CPU (connection control unit) of the apparatus 11-4 cancels the port VLAN that has been set in the switch block 103 to communicatively connect the switch unit of the apparatus 11-4 to the switch device 2-1.

As described above, according to the present embodiment, in a case where a network is constituted by connecting the apparatus network 22 to the backbone network 21 at two points, the determination unit 50 is provided in the apparatus 11-1 and also the initial setting unit 60 and the determination-information obtaining unit 61 are provided in the apparatus 11-4 so as to normally disconnect direct communication between the apparatus 11-4 and the switch device 2-1 and so as to start the direct communication between the apparatus 11-4 and the switch device 2-1 when a communication failure occurs between the apparatus 11-1 and the switch device 2-2 or in the apparatus network 22. Therefore, by means of a simple control process, formation of a loop (ring) communication path can be prevented and also the redundancy of the network can be secured.

According to the present embodiment, a redundant network can be constructed without applying a spanning tree protocol to both the backbone network 21 and the apparatus network 22.

In a conventional network system to which a spanning tree protocol is applied, in order to determine a root bridge, it is necessary that switches communicate with each other. For example, bridge protocol data units (BPDUs) need to be exchanged between all the switches. In contrast thereto, in the present embodiment, the redundancy of the network can be secured by providing an additional function only to the apparatuses 11-1 and 11-4 that are connected directly to the backbone network 21 without the need of providing an additional function to the apparatuses 11-2 and 11-3 and to the backbone network 21 and without transmitting and receiving data between devices other than between the apparatuses 11-1 and 11-4.

By detecting the link state with the switch device 2-2, the apparatus 11-1 determines whether it is possible for the apparatus 11-1 and the backbone network 21 to communicate with each other. As described above, whether it is possible for the apparatus 11-1 and the backbone network 21 to communicate with each other is determined based on a monitoring function in the apparatus 11-1. Therefore, it is not necessary to provide a separate device or the like that determines the possibility of communication therebetween in the backbone network 21. Accordingly, any additional setting change is not needed in the backbone network 21.

In the present embodiment, as illustrated in FIG. 1, the apparatuses 11-1 to 11-4 are connected in a daisy chain, for example. However, it is satisfactory if the network system has a configuration in which the apparatus network 22 and the backbone network 21 are connected at two points. The network system does not depend on a specific configuration of the apparatus network 22. For example, a configuration as illustrated in FIG. 5 is also possible.

Figure 5:
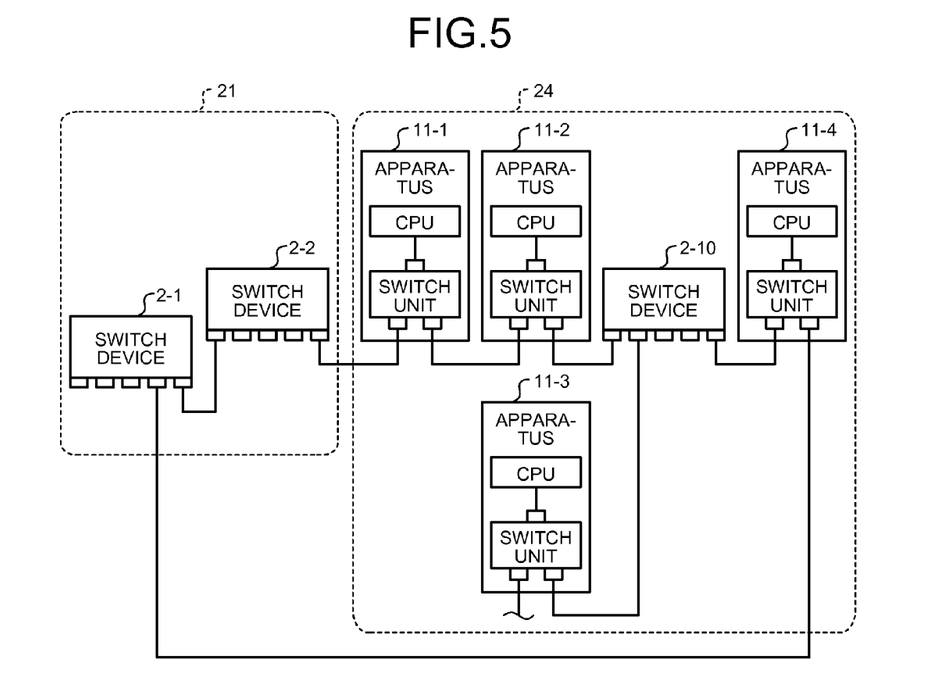
FIG. 5 is a diagram illustrating an example of the configuration of a network system according to a first modification of the first embodiment.

FIG. 5 is a diagram illustrating the configuration of a network system according to a first modification of the present embodiment. In FIG. 5, an apparatus network 24 is configured differently from FIG. 1. That is, the apparatus network 24 is configured from, for example, the apparatuses 11-1 to 11-4, a switch device 2-10, and other devices, and the apparatuses 11-1 and 11-4 are not connected in a daisy chain. Specifically, the apparatus 11-1 is connected to the apparatus 11-2, the apparatus 11-2 is connected to the switch device 2-10, and the switch device 2-10 is connected to the apparatuses 11-3 and 11-4. However, the apparatus 11-1 is connected to the switch device 2-2 and the apparatus 11-4 is connected to the switch device 2-1 in a similar manner to that in FIG. 1. The apparatuses 11-1 and 11-4 have functions similar to the functions described with reference to FIGS. 1 to 4.

Further, the apparatus 11-4 normally disconnects direct communication with the switch device 2-1. Based on the latest determination information from the apparatus 11-1, when the switch unit of the apparatus 11-1 is not communicatively connected to the switch device 2-2 or when the apparatus 11-4 cannot communicate with the apparatus 11-1 via the apparatus network 24 (specifically, via the switch device 2-10 and the apparatus 11-2 in this order), the apparatus 11-4 starts direct communication with the switch device 2-1. Due to this operation, the present modification can achieve effects similar to those in the configuration in FIGS. 1 to 4.

In the present embodiment, the backbone network 21 is configured from two switch devices 2-1 and 2-2, for example. However, the present embodiment can be applied without depending on the configuration of the backbone network 21. For example, a configuration as illustrated in FIG. 6 is also possible.

Figure 6:
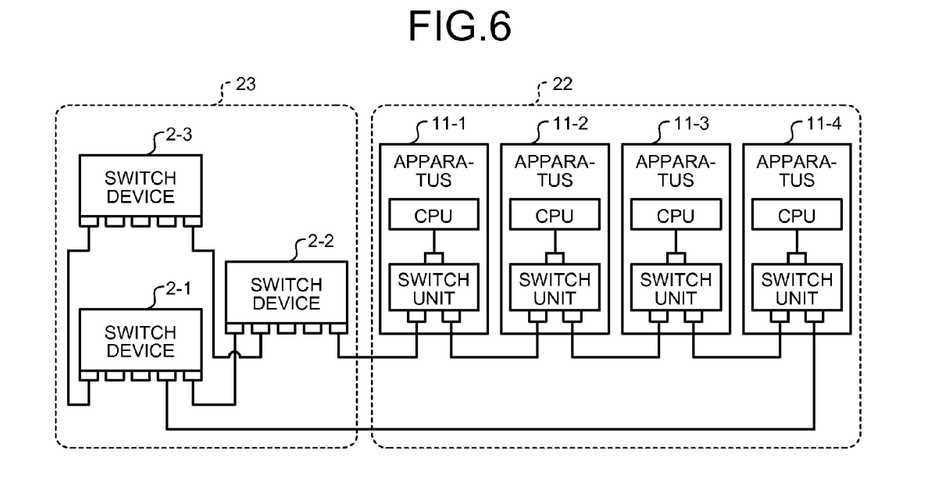
FIG. 6 is a diagram illustrating an example of the configuration of a network system according to a second modification of the first embodiment.

FIG. 6 is a diagram illustrating the configuration of a network system according to a second modification of the present embodiment. In FIG. 6, a backbone network 23 is configured differently from FIG. 1. That is, the backbone network 23 is configured from, for example, switch devices 2-1 to 2-3 and other devices, and a physical loop (ring) is formed by connecting the switch devices 2-1 to 2-3. The apparatus network 22 is connected to the backbone network 23 at two points. Specifically, the apparatus 11-1 and the switch device 2-2 are connected and the apparatus 11-4 and the switch device 2-1 are connected. The apparatuses 11-1 and 11-4 have functions similar to the functions described with reference to FIGS. 1 to 4.

The backbone network 23 is an existing network that has been already in operation, and therefore a case is considered where the apparatus network 22 is additionally connected to this existing backbone network 23. In this case, because the backbone network 23 has been already in operation, it is apparent that a procedure has been performed in order not to form a loop (ring) in a communication path by any method. In a case where the apparatus network 22 is connected to this existing backbone network 23, a new physical loop (ring) is formed by the backbone network 23, the apparatus network 22, and network cables connecting them. However, the apparatuses 11-1 and 11-4 perform the control process described with reference to FIGS. 1 to 4. This can prevent generation of a loop communication path and can also secure the redundancy of the network.

As described above, even in a case where the backbone network 23 has been already constructed, the apparatus network 22 is connected later to this backbone network 23, and the apparatuses 11-1 to 11-4 are mounted on the apparatus network 22, formation of a loop can still be prevented without depending on the configuration of the backbone network 23 and without changing the configuration of the backbone network 23. Therefore, even in a case where the apparatus network 22 is added, the network system is easily constructed.

In contrast thereto, in a conventional case where a spanning tree protocol is applied, when a sub-network is additionally connected, it is necessary to apply the spanning tree protocol to the entire network after the sub-network is connected in order to reconstruct a communication path.

Second Embodiment

Figure 7:
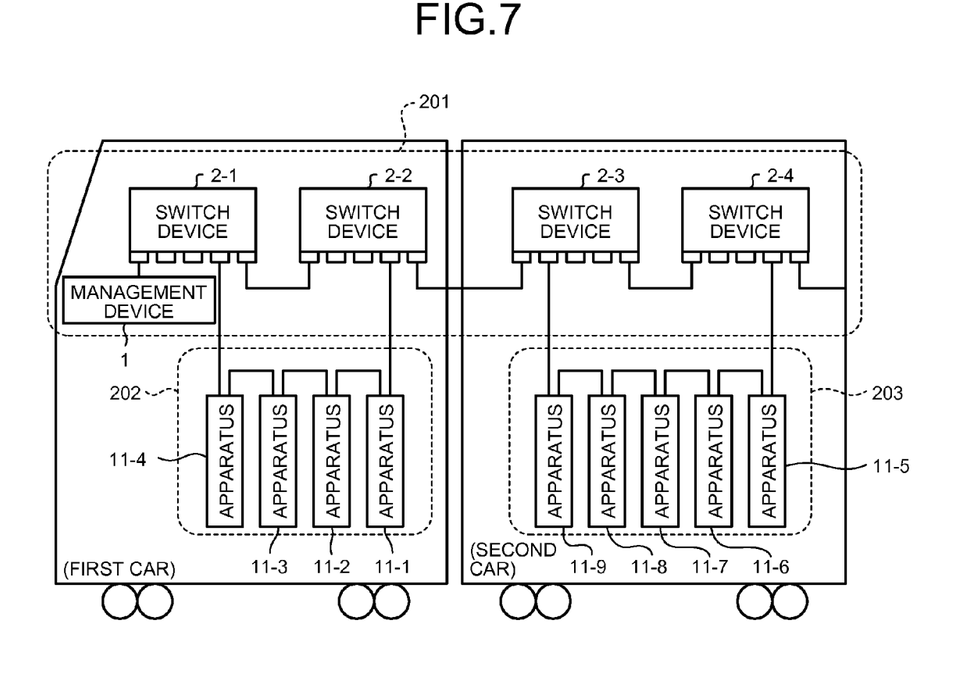
FIG. 7 is a diagram illustrating an example of the configuration of a network system according to a second embodiment.

FIG. 7 is a diagram illustrating an example of the configuration of a network system according to the present embodiment. As illustrated in FIG. 7, the network system according to the present embodiment is constructed within a train. The train is constituted by a formation in which a plurality of vehicles are coupled with each other, for example. FIG. 7 illustrates a first car (a head vehicle or a tail vehicle) and a second car, for example. There is also a case where a train is constituted by a single-vehicle formation or a three or more-vehicle formation.

A backbone network 201 is a network provided across the vehicles within the train. The backbone network 201 is configured to include switch devices 2-1 to 2-4, and a management device 1, for example. The switch devices 2-1 to 2-4 are connected in a daisy chain in this order, for example. That is, the switch device 2-1 is connected to the switch device 2-2, the switch device 2-2 is connected to the switch device 2-3, and the switch device 2-3 is connected to the switch device 2-4. The management device 1 and the switch devices 2-1 and 2-2 are installed in the first car, for example. The management device 1 is connected to the switch device 2-1, for example. The switch devices 2-3 and 2-4 are installed in the second car, for example. Each of the switch devices 2-1 to 2-4 is the Ethernet® switch, for example, in a similar manner to the first embodiment. The number of switch devices installed in each vehicle is not limited to two in the example in FIG. 7.

In order to monitor the state of apparatuses 11-1 to 11-9, the management device 1 regularly communicates with these apparatuses 11-1 to 11-9 using the backbone network 201 and apparatus networks 202 and 203. The management device 1 is specifically a train-information management device. The train-information management device is a device that collects and manages train information, and can monitor the operating states of in-vehicle apparatuses and also individually control an operation of each apparatus. The train-information management device regularly transmits a state-data request signal to the in-vehicle apparatuses. Upon reception of this state-data request signal, each of the apparatuses sends a response signal including the state data of the apparatus back to the management device 1. In this manner, the train-information management device regularly communicates with the in-vehicle apparatuses. The management device 1 can be provided in a vehicle other than the first car or the management device 1 can be provided in each vehicle.

The apparatus network 202 is a sub-network of apparatuses provided in the first car and is connected to the backbone network 201 at two points. The apparatus network 202 is configured from four apparatuses 11-1 to 11-4 that are connected in a daisy chain, for example. Specifically, the apparatus 11-1 is connected to the apparatus 11-2, the apparatus 11-2 is connected to the apparatus 11-3, and the apparatus 11-3 is connected to the apparatus 11-4. Each of the apparatuses 11-1 to 11-4 has an internal configuration similar to the apparatus 11 described in the first embodiment (see FIGS. 2 to 4). Particularly, the apparatus 11-1 in the apparatus network 202 is connected to the switch device 2-2 and has functions identical to the apparatus 11-1 in the first embodiment. Also, the apparatus 11-4 in the apparatus network 202 is connected to the switch device 2-1 and has functions identical to the apparatus 11-4 in the first embodiment. Therefore, the connecting mode between the apparatus network 202 and the backbone network 201 is similar to that in FIG. 1 in the first embodiment.

The apparatus network 203 is a sub-network of apparatuses provided in the second car and is connected to the backbone network 201 at two points. The apparatus network 203 is configured from five apparatuses 11-5 to 11-9 that are connected in a daisy chain, for example. Specifically, the apparatus 11-5 is connected to the apparatus 11-6, the apparatus 11-6 is connected to the apparatus 11-7, the apparatus 11-7 is connected to the apparatus 11-8, and the apparatus 11-8 is connected to the apparatus 11-9. Each of the apparatuses 11-5 to 11-9 has an internal configuration similar to the apparatus 11 described in the first embodiment (see FIGS. 2 to 4). Particularly, the apparatus 11-5 in the apparatus network 203 is connected to the switch device 2-4 and has functions identical to the apparatus 11-1 in the first embodiment. Also, the apparatus 11-9 in the apparatus network 203 is connected to the switch device 2-3 and has functions identical to the apparatus 11-4 in the first embodiment. Therefore, the connecting mode between the apparatus network 203 and the backbone network 201 is also similar to that in FIG. 1 in the first embodiment.

As described above, in the present embodiment, in a case where a network is constituted by connecting each of the apparatus networks 202 and 203 to the backbone network 201 at two points, formation of a loop communication path can be prevented and also the redundancy of the network can be secured by means of a simple control process in a similar manner to the first embodiment without applying a spanning tree protocol.

The apparatuses 11-1 to 11-9 can be display devices, for example. In this case, the redundancy of the apparatus networks 202 and 203 is secured and the redundancy of onboard displays by the apparatuses 11-1 to 11-9 is secured.

While in the present embodiment, the network system is configured to provide an apparatus network in each vehicle, the network system can be also configured to provide an apparatus network across a plurality of vehicles. Other configurations, operations, and effects of the present embodiment are similar to those of the first embodiment.

INDUSTRIAL APPLICABILITY

The present invention is useful as a network system having a redundant configuration.

REFERENCE SIGNS LIST 1 management device, 2-1 to 2-4, 2-10 switch device, 11-1 to 11-9 apparatus, 21, 23, 201 backbone network, 22, 24, 202, 203 apparatus network, 50 determination unit, 60 initial setting unit, 61 determination-information obtaining unit, 101 CPU, 102 switch unit, 103 switch block, 104, 105 network interface (I/F) unit, 106 CPU interface (I/F) unit, P1 to P3 port.

The invention claimed is:

1. A network system comprising:
a backbone network that is constituted by combining a plurality of switch devices; and
an apparatus network that is constituted by combining a plurality of apparatuses, each of which includes therein a switch unit and a connection control unit that is capable of controlling a connection of the switch unit to perform communication, where the apparatus network is connected to the backbone network at only two points by connecting a switch unit of a first apparatus that is one of the apparatuses to the backbone network and by connecting a switch unit of a second apparatus that is another one of the apparatuses to the backbone network, wherein
a connection control unit of the first apparatus includes a determination unit that determines whether the switch unit of the first apparatus is communicatively connected to the backbone network,
a connection control unit of the second apparatus includes
an initial setting unit that initializes a setting of direct communication with the backbone network to a state where the switch unit of the second apparatus is disconnected from the backbone network at startup, and
a determination-information obtaining unit that obtains determination information regarding whether the switch unit of the first apparatus is communicatively connected to the backbone network by querying the determination unit via the apparatus network, and
based on the determination information obtained from the determination unit by the determination-information obtaining unit, when the switch unit of the first apparatus is communicatively connected to the backbone network, the connection control unit of the second apparatus maintains a state where the switch unit of the second apparatus is disconnected from the backbone network as for direct communication with the backbone network, and when the switch unit of the first apparatus is not communicatively connected to the backbone network or when the second apparatus is not capable of communicating with the first apparatus, the connection control unit of the second apparatus connects the switch unit of the second apparatus to the backbone network such that the switch unit of the second apparatus is capable of directly communicating with the backbone network.

2. The network system according to claim 1, wherein the apparatuses are connected in a daisy chain,
an apparatus at one end of the daisy-chain connection is the first apparatus, and
an apparatus at another end of the daisy-chain connection is the second apparatus.

3. The network system according to claim 1, wherein the backbone network is constituted by connecting the switch devices in a loop.

4. The network system according to claim 1, wherein the backbone network is provided across vehicles of a train, and
the apparatus network is provided in each of the vehicles.

5. The network system according to claim 4, wherein each of the apparatuses is a display unit.

* * * * *